Patented May 7, 1940

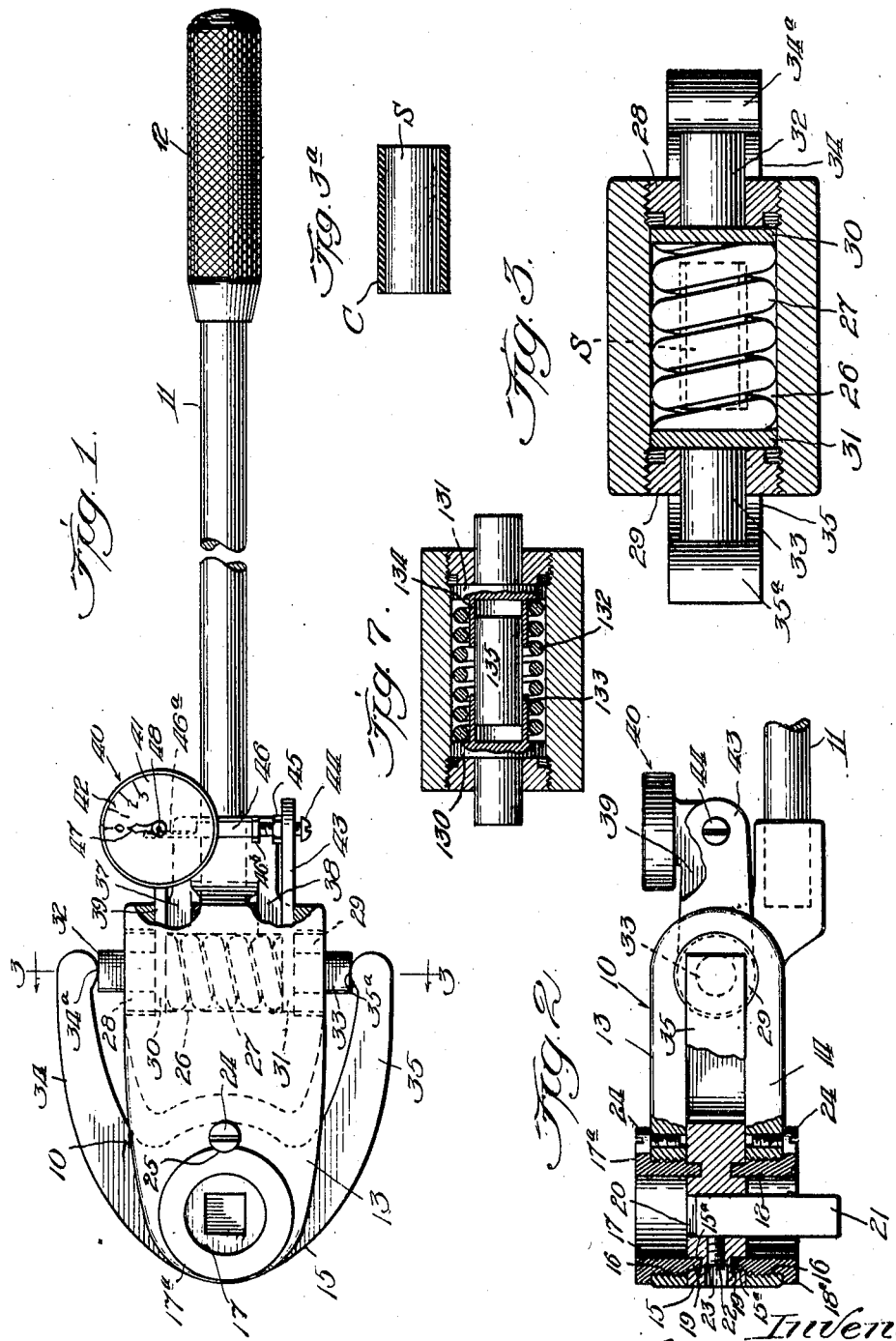

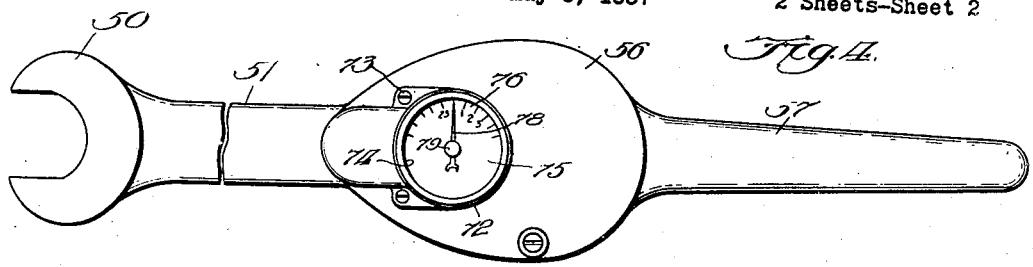
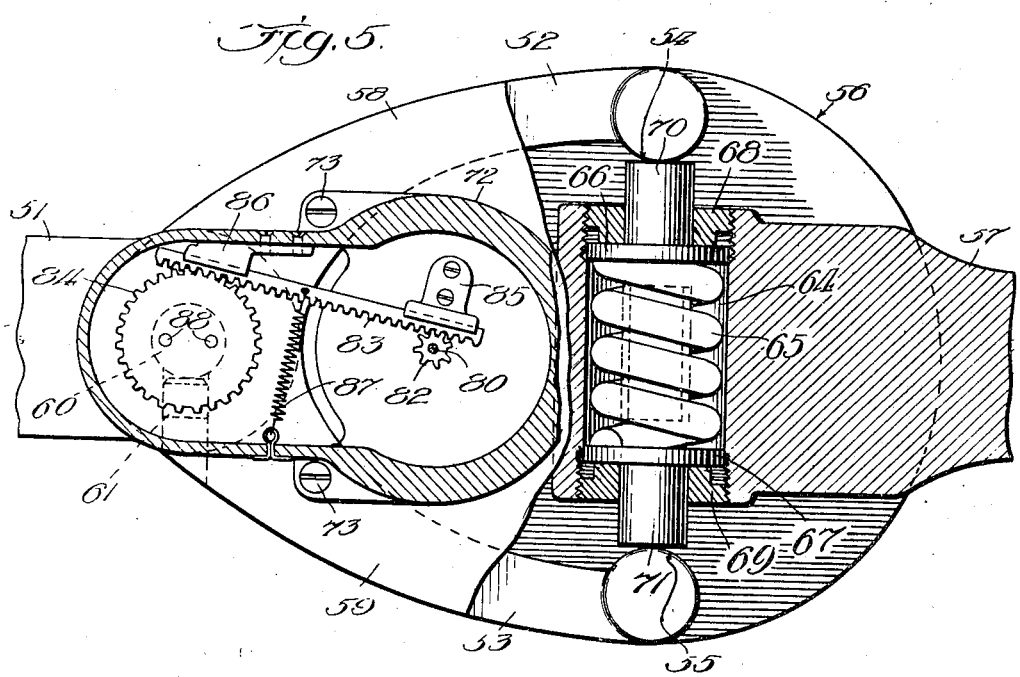
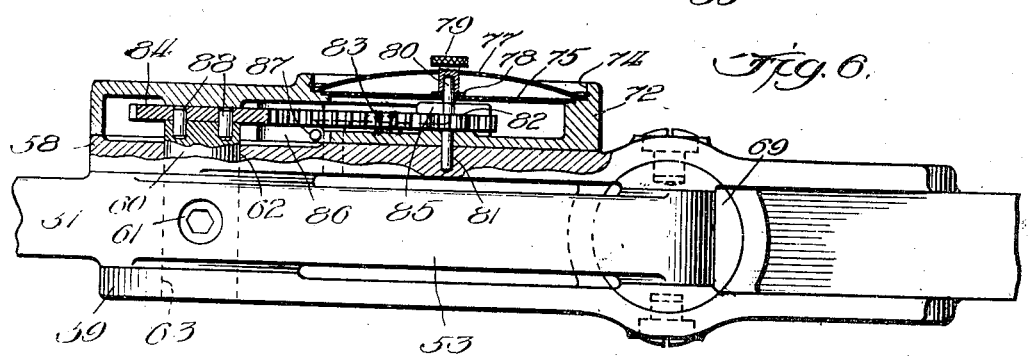

2,199,553

UNITED STATES PATENT OFFICE 2,199,553

TORQUE MEASURING WRENCH

Herman W. Zimmerman, Highland Park, Ill., assignor, by mesne assignments, to Automotive Maintenance Machinery Co., North Chicago, Ill., a corporation of Illinois Application May 8, 1937, Serial No. 141,426

13 Claims. (Cl. 265—1)

My invention relates to wrenches, and it has to do especially with wrenches adapted for measuring the force or torque applied therethrough in tightening, loosening or otherwise moving the work, which may take the form of nuts, bolts, studs and the like.

One of the objects of my invention is to provide an improved wrench of the foregoing character which is of simple and sturdy construction, is inexpensive to manufacture, is accurate in its recording function, and which serves its intended purpose in an efficient manner at all times.

Another object is to provide a compact torque measuring structure for a wrench of the foregoing kind, which structure embodies but few operating parts that may be readily assembled, disassembled and adjusted.

A further object is to provide an improved torque measuring means having a visible pressure indicator for a wrench of the foregoing character, the arrangement being such that it is well suited for a wrench having a long handle adapted to be grasped and actuated by the operator at a point remote from the work, and wherein the parts are so positioned that the torque or pressure indicator is located in close proximity to and directly within the vision of the operator, notwithstanding the length of the wrench handle and the position of the operator with respect to the work.

Still another object is to provide a double-acting wrench of the foregoing character adapted to measure the force or torque applied to the wrench in moving the work in opposite directions to tighten or loosen the same, the arrangement being such that a single, double-acting torque measuring means is employed for indicating the force or torque applied during both of such movements.

An additional object is to provide means for preventing distortion of the force or torque measuring spring by the application of an excessive and abnormal pressure to the wrench.

Other objects and advantages become apparent as this description progresses, and by reference to the drawings, wherein—

Figure 1 is a top plan view, partially in section, of one form of wrench structure embodying my invention;

Fig. 2 is a fragmentary side elevational view, partially in vertical section, of the structure shown in Fig. 1;

Fig. 3 is an enlarged sectional view taken substantially on line 3—3 of Fig. 1;

Fig. 3ª is a separated, side elevational view of the spring stop pin shown in Fig. 3;

Fig. 4 is a top plan view of another form of wrench embodying my invention;

Fig. 5 is an enlarged horizontal sectional view taken through the torque measuring means of Fig. 4;

Fig. 6 is a side elevational view, partially in section, of the structure shown in Fig. 5; and Fig. 7 (Sheet 1) is a fragmental sectional view of another form of spring stop for wrenches of the foregoing character.

The structure shown in Figs. 1 to 3 of the drawings includes an elongated body part 10 having a handle 11 with a hand grip portion 12 (Fig. 1). The forward end of the body 10 is bifurcate, providing vertically spaced-apart sections 13 and 14 between which is mounted a wishbone-shaped rock member 15 (Fig. 2).

The member 15 is rockably supported between the body sections 13 and 14 in the following manner: The sections 13 and 14 are provided with aligned threaded openings 16, in which are mounted bushings 17 and 18 having head portions 17ª and 18ª adapted to seat against the outer surfaces of the respective sections 13 and 14. The inner ends of the bushings 17 and 18 are provided with annular tongues 19 which seat in aligned annular grooves 15ª in the member 15, thereby confining the member 15 rotatably or rockably in place between the sections 13 and 14. The bushings 17 and 18 are fixedly locked in their assembled positions by set screws 24 having their threaded stems engaged with the body 10 and their heads seated in suitable recesses 25 in the peripheral edge portions of the bushing heads.

The member 15 is provided at its rock center with a rectangular or other irregularly-shaped opening 20 in which is non-rotatably received a similarly-shaped adapter member 21 of sufficient length to extend downwardly through and beyond the bushing 18. This adapter member 21 is fixedly secured to the member 15 by a set screw 22 which is mounted in the inner and reduced end of a suitably provided opening 23 in the member 15. The adapter member 21 may receive any suitable adapter element, such as a socket or the like (not shown), for positively engaging the member 15 with the work.

In carrying out my invention, relative rock movement between the member 15 and the body 10 is yieldingly opposed by a single compressible spring means, and the extent of compression of this spring means is measured, preferably in terms of inch-pounds, to determine the amount of force or torque applied through the wrench to the work in tightening and loosening the same. More particularly, a lateral chamber 26 is provided in the rear portion of the body 10 and a coil spring 27 is mounted therein. The opposite ends of the chamber 26 are closed by adjustable screw plugs 28 and 29, and pressure members 30 and 31 are mounted in such chamber at the opposite ends of the spring 27. The spring 27 is of such length and the plugs 28 and 29 are screwed inwardly to such an extent that the spring 27 yieldably holds the pressure members 30 and 31 against the inner ends of the plugs 28 and 29. The pressure members 30 and 31 are provided with reduced stems 32 and 33 which project slidably through openings in the plugs 28 and 29 and outwardly beyond the sides of the body 10.

The member 15 is provided, on the opposite sides of its rock center, with rearwardly extending arms 34 and 35 which project laterally through the open sides of the space between the body sections 13 and 14. These arms are of sufficient length to extend rearwardly along the sides of the body 10 into alignment with the outer ends of the pressure member stems 32 and 33, and they are spaced apart to such an extent and the pressure member stems 32 and 33 are of such length that the ends of such arms 34 and 35 normally abut the outer ends of such stems without any material pressure being applied to either of the arms. In this way, the rock member 15 is held in a central, balanced or neutral position with respect to the body 10. The ends of the arms 34 and 35 are rounded as at 34ª and 35ª so as to minimize the frictional contact between such arms and the pressure member stems, the ends of which are preferably flat, thereby facilitating rock movement of the arms upon the ends of the pressure member stems and also minimizing tendency to apply lateral strains and stresses to the spring 27 during rock movement of the member 15. Also, the arms 34 and 35 are so shaped and related to the spring 27 and pressure devices that the axes of the latter extend at substantially right angles to such arms, thereby further minimizing drag, strains and stresses that may be imposed on the pressure members and other parts and insuring greater accuracy in the torque recording action.

It will be seen from the foregoing that when the member 15 is connected to the work and the handle 11 is moved in a clockwise direction (as viewed in Fig. 1) to tighten the work, for example, relative rock movement between the member 15 and the body is yieldingly opposed by the spring 27. However, as soon as the work offers sufficient resistance to overcome the initial tension of the spring 27 (which may be varied by adjustment of either or both of the screw plugs 28 and 29), such spring will be compressed to an extent determined by the amount of force or torque applied, resulting in relative rock movement between member 15 and body 10. As this action takes place, in the particular operation noted, the pressure member 33 moves inwardly to an extent dependent upon the amount of compression of the spring 27, while the pressure member 32 remains stationary. When the wrench is moved in an opposite direction, as when loosening the work, tne same action takes place except that the spring 27 is compressed from its opposite end and the pressure member 32 is moved inwardly while the pressure member 33 remains stationary.

The amount of force or torque applied to the wrench is measured by indicating mechanism directly associated with the spring structure and, particularly, the pressure members thereof. Specifically, the rear end of the body 10 adjacent each of the ends of the spring 27 is provided with laterally-extending and rearwardly-opening slots 37 and 38 (Fig. 1) of a width substantially equal to the extent of maximum compression of the spring 27 at either end. The pressure member 30 is provided with a rearwardly extending arm 39 which projects through the slot 37 and supports a horizontally-disposed gage device 40 having a dial 41 with a scale 42 thereon calibrated to register the extent of compression of the spring 27 in terms of pressure (preferably inch-pounds pressure) applied to the work through the wrench. The other pressure member 31 is also provided with a rearwardly-extending arm 43 which projects through the slot 38, and the rear end of this arm adjustably supports a screw member 44 adapted to be locked in position by a nut 45, as will be well understood by referring to Fig. 1. The gage 40 is further provided with a laterally-extending slide member 46 having an inner rack portion 46ª and an outer upturned end portion 46ᵇ. The slide bar 46 is of such length that its outer upturned end 46ᵇ normally seats against the inner end of the adjusting screw member 44. The gage 40 additionally includes a pointer 47 which is rotatably supported for movement relative to the gage scale 42. The gage hand 47 is preferably connected to an inwardly-extending member 48 having a pinion thereon (not shown) adapted to engage the rack end 46ª of the slide bar 46. The gage hand 47 and slide bar 46 (Figs. 1 and 2) are so related that when the parts assume the normal position shown in Fig. 1 and the gage 40 and arm 44 are separated to the extent indicated, the gage hand 47 registers with the zero marking of the scale 42. However, when the wrench is applied to the work and moved so as to tighten the same, and the work offers sufficient resistance to compress the spring 27, the arm 43 will be moved toward the gage 40, actuating the bar 46 and, in turn, moving the gage hand 47 in a clockwise direction (as viewed in Fig. 1) to register the extent of compression of the spring in terms of inch-pounds pressure applied to the work. On the other hand, when the wrench is operated in the opposite direction, as when loosening the work, and upon compression of the spring 27, the arm 39 and gage 40 will be moved toward the then-stationary arm 43, causing a similar movement of the gage hand 47 to register that compression of the spring in terms of inch-pounds pressure applied to the work.

It is believed that the operation of the foregoing structure will be well understood from the description given above. A single, laterally-disposed spring is employed for opposing relative rock movement between the member 15 and body 10 in opposite directions in the performance of the torque measuring function. Proper relation of the parts for accurate indication of the pressure applied may be established by properly adjusting the screw member 44 so as to accurately register the initial compression of the spring and, in turn, the initial indication of the force or torque applied. Also, by adjusting the member 44, the pointer 47 may be caused to properly register with the zero or other marking on the dial 42.

It is highly desirable that distorting of the spring 26 be avoided in order to assure accurate recording of the force or torque. The extent of full and safe compression of the spring 26 is limited, and this limit may be reached when the several coils of the spring solidly abut each other. If further pressure should be applied to the wrench and spring after this condition is reached, such as may happen when the wrench is used by an unskilled or careless person, the spring becomes distorted and will not return to its original and normal condition and it will not accurately serve its part in the torque measuring action, thereby requiring replacement of the same. To avoid such a condition, I employ stop means for limiting the compression of the spring to its full and safe extent, after which the wrench becomes, in effect, a rigid structure without further pressure being applied to the spring. Specifically, I employ a floating stop pin S (Figs. 3 and 3a) disposed within the coils of the spring 26. This pin is of such length that, when the spring 26 is compressed to its safe limit, its opposite ends solidly engage the pressure members 32 and 33 and any further force exerted on the wrench is applied directly and solidly through the respective arm (34 or 35), respective pressure member (32 or 33) and pin S without the exertion of further pressure on the spring 26. If desired, the pin S may be sheathed in a cover C formed of rubber or other sound-deadening material to avoid noise due to shifting of the pin S.

The wrench shown in Figs. 1 to 3, inclusive, is best suited for tightening and loosening work of a character not requiring long handles. In cases where it is desirable or necessary to use long handle wrenches, I may employ structures of the character shown in Figs. 4 to 6, inclusive, wherein the torque measuring means is located in close proximity to the operator so that, even though he is positioned remotely from the work, he may readily observe, through suitable pressure indicating means, the amount of force or torque applied to the work.

Specifically, the structure shown in Figs. 4 to 6, inclusive, includes a wrench member having a head 50 adapted to directly engage the work and a long shank or handle 51, the rear end of which is of wishbone shape, providing spaced-apart arms 52 and 53 having rounded end contact elements 54 and 55. The rear end of the shank 51 adjacent the arms 52 and 53 is rockably supported in the body portion 56 of a torque measuring unit having a rearwardly-extending stub handle portion 57 which is adapted to be grasped by the operator.

The body 56 is preferably, but not necessarily, of pear-like shape in plan outline and it is bifurcate at its forward end, providing vertically spaced-apart sections 58 and 59, between which the shank 51 and its arms 52 and 53 are rockably connected and supported. The rock connection between these parts is accomplished by a stub-like shaft member 60 secured in an opening through the rear end of the shank 51 by a set screw 61. The shaft 60 is of sufficient length that its ends extend outwardly beyond the opposite faces of the shank 51, and these extended portions are rotatably received in suitably aligned openings 62 and 63 in the opposed body sections 58 and 59. The shank 51, at its point of connection with the body 56, is of sufficient thickness to snugly fit between the body sections 58 and 59 so that when these parts are connected together by the stub shaft 60, they are firmly interlocked against movement in any direction except rotatably.

The shank arms 52 and 53 are so shaped and are of sufficient length to extend rearwardly along the sides of the space between the body sections 58 and 59, where their rounded contact portions 54 and 55 cooperate with spring structure which yieldably opposes relative rock movement between the body 56 and shank 51. Specifically, this structure includes a lateral chamber 64 in the body 56, in which is mounted a spring 65 similar to the spring 27 of the first form. The spring 65 acts upon pressure members 66 and 67, similar to the pressure members 30 and 31, which are confined by adjustable screw plugs 68 and 69 similar to the plugs 28 and 29 (Fig. 1). The pressure members 66 and 67 are provided with reduced stems 70 and 71 that project slidably through suitable openings in the screw plugs 68 and 69, and they are of such length as to engage the opposed arm contact elements 54 and 55 and normally hold the arms 52 and 53 and the shank 51 in a neutral or balanced condition with respect to the body 56 and with the shank 51 aligned with the stub handle 57. Compression of the spring 65 beyond its full and safe limit of compression is prevented by a stop pin S similar to that shown in Fig. 3a and previously described.

In the use of this form of my invention, when the wrench head 50 is applied to the work and the stub handle 57 is grasped by the operator and the entire structure is moved clockwise (as viewed in Fig. 4) to tighten the work, the spring 65 will be compressed and the pressure member 67 will move inwardly as soon as the work offers sufficient resistance to overcome the initial tension of the spring 65. On the other hand, when the wrench is similarly applied and operated in the opposite direction (counterclockwise as viewed in Fig. 4) to loosen the work, the same spring 65 is likewise compressed from the opposite end and the pressure member 66 is moved inwardly. In the foregoing action, relative rock movement between the shank 51 and body 56 takes place, the extent of such movement being dependent upon the amount of pressure applied through the wrench to the work and also the extent of compression of the spring 65. By measuring the extent of the relative rock movement that takes place in this operation, I determine in terms of inch-pounds pressure applied to the wrench the amount of force or torque applied through the wrench to the work.

Specifically, to the foregoing end, I employ an indicator casing 72 detachably secured to the section 58 of the body by screw or other fastening devices 73. The casing 72 is provided with a rimmed opening 74 in which is located a dial 75 (Fig. 6) bearing a scale 76 (Fig. 1) calibrated to register the extent of relative rock movement of the shank 51 and body 56 in terms of inch-pounds pressure applied. The dial is covered by a transparent shield 77 of usual form. This indicating structure further includes a rotatable pointer 78 which is moved relative to the scale 76 by relative rock movement of the parts above mentioned, and the structure for accomplishing this movement will now be described.

The pointer or gage hand 78 is rigidly carried by a rotatable finger-piece 79 which is frictionally fitted to the upper tapered end of a depending shaft 80, the lower end of which is rotatably carried in an opening 81 suitably provided in the upper body section 58. The taper fit between the shaft 80 and the finger-piece 79 permits relative rotation between these parts by the application of sufficient rotative pressure to the finger-piece 79 while the shaft 80 is held stationary to enable the gage hand 78 to be set independently of movement of the shaft 80 to any desired position with respect to the scale 76. The shaft 80 supports a small pinion 82, the teeth of which are engaged with the teeth at one end of a horizontally disposed rack 83, which has its teeth at its other end engaged with the teeth of a comparatively large gear 84 connected to the upper end of the stub shaft 60 so as to move with the shank 51. The rack 83 is supported in the desired horizontal position by brackets 85 and 86 at the opposite ends of the rack, which have suitable slideways therein. The rack is also yieldingly pressed toward the pinion 82 and gear 84 by a coil spring 87 secured at one end to the rack and at the other end to an appropriate part of the casing 72. The connection between the gear 84 and stub shaft 60 is a detachable one, comprising a pair of pins 88 carried by the gear 84 and removably engaged in suitably aligned openings in the upper end of the stub shaft 60. With this arrangement, the casing and the indicating structure just described may be readily removed as a unit from the body 56.

In use, when the shank 51 and body 56 are rocked relatively to each other in either direction, the shaft 80 is caused to rotate through the movement of the pinion 82 and rack 83 by gear 84. The gear 84 and pinion 82 are of such size that slight rock movement of the parts results in a substantial rotative movement of the gage hand 78 to more readily and accurately indicate to the operator the pressure condition that exists. When this form of wrench is applied to the work and actuated to tighten or loosen the same, the gage hand 78 does not move until the work offers sufficient resistance to overcome the initial tension of spring 65. When the gage hand 78 does move, through relative rock movement of the shank 51 and body 56, the extent of movement will depend upon the amount of pressure applied to the stub handle 57 and the extent of compression of spring 65 and relative rock movement of the parts. This action may readily be observed by the operator, since the visual indicating parts are located in close proximity to the part of the wrench grasped by his hands, notwithstanding the fact that the work engaged by the wrench head 50 may be located a considerable distance away.

Various forms of spring stop means, other than those shown in Figs. 3 and 3ª, may be employed. For example, I may use the form shown in Fig. 7, which includes pressure members 130 and 131 at the opposite ends of and between which the spring 132 is confined. These pressure members are provided with tubular stems 133 and 134, respectively, which are preferably of equal length and extend toward each other within the coils of the spring 132. A floating spring stop pin 135 has its opposite ends slidably engaged in the tubular stems 133 and 134, and this pin is of such length that its opposite ends will engage the pressure members 130 and 131 at the other ends of the stems 133 and 134 when the full and safe compression of the spring is reached. Obviously, in this form, as well as the other forms above described, the length of the stop pin may be varied to limit the spring compression to any predetermined extent less than full compression.

Other spring stops may take the form of solid stems of proper length on the pressure members extending toward each other within the spring coils and adapted to abut each other when full compression is reached; or an open-ended sleeve may be substituted for the pin 135 of Fig. 7, in which case the ends of the sleeve would slidably receive stems on the pressure members which may be solid or tubular; or one pressure member may have a solid stem projecting therefrom within the spring coils, the free end of which stem is slidably received within an aligned, open-ended tubular stem carried by the other pressure member.

It is believed that the advantages of my invention will be well understood from the foregoing. A device embodying my invention requires but few parts and they are of simple and sturdy construction. The structure may be accurately used by unskilled labor. It may be accurately employed in connection with long or short handle wrenches. The torque measuring means is of such character that the indicating portion thereof is always conveniently available to the eye of the operator so that he may accurately determine the force or torque condition. Through the use of my invention, any particular nut, bolt, stud or other piece of work may be set up or tightened to a predetermined extent, and in such a way as to avoid breakage or distortion of the same or the placing of the same under such strains and stresses as may result in an early breakdown. Also, in every case where it may be required, a series of pieces of work may be successively set up in a uniform manner.

It is to be understood that, while I have shown and described several forms of devices embodying my invention, other changes in details and arrangements of parts may be resorted to without departing from the spirit and scope of my invention as defined by the claims that follow.

I claim:

1. A torque measuring wrench comprising a body, a handle thereon, a rock member on said body and having means substantially on the rock center thereof through which it is adapted to be engaged with the work, arms on said member on the opposite sides of the rock center thereof and extending lengthwise of said body, a compression spring member carried by said body between said arms and with its ends disposed theretoward, means operably engaging the opposite ends of said spring with said arms respectively so that said spring yieldably opposes rock movement of said member in opposite directions, and means operably associated with said rock member for indicating extent of rock movement of said rock member in terms of pressure applied through said body, spring and rock member to the work.

2. A torque measuring wrench comprising a body, a member rockably supported by said body and having means through which it is adapted to be engaged with the work, arms on said rock member on the opposite sides of the rock center thereof and extending lengthwise of said body, a spring carried by said body and having its axis disposed at substantially right angles to said arms in alignment therewith, pressure devices slidably supported by said body and engaging the ends of said spring with said arms so that said spring normally holds said rock member in a neutral or balanced position relative to said body and yieldingly opposes rock movement of said rock member, the arrangement being such that said spring is compressed in a substantially true axial direction as said body and rock member rock relatively, and means for indicating extent of relative rock movement between said body and rock member in terms of pressure applied through the wrench to the work.

3. A torque measuring wrench which comprises a body having a handle thereon and a laterally extending chamber intermediate its ends, a member rockably supported by said body and having provision for operative engagement with the work, a spring mounted in said chamber, pressure members slidable in said chamber at the opposite ends of said spring and having stem portions projecting therefrom with a contact surface thereon, arms on said rock member extending along the sides of said body and having contact surfaces engaged with the contact surfaces of said pressure member portions, respectively, so that said spring opposes rock movement of said rock member in opposite directions, certain of said contact surfaces being rounded and the other and opposed of said surfaces being flat, and means associated with said spring and pressure members for indicating extent of compression of said spring in terms of pressure applied through the wrench to the work.

4. A torque measuring wrench comprising a body, a rock member thereon and having means by which it is adapted for engagement with the work, arms on said member on the opposite sides of the rock center thereof and extending lengthwise of said body, pressure members slidably carried by said body and oppositely engaging said arms at substantially right angles thereto, a compressible spring between said pressure members and yieldably opposing movement of the same toward each other and in turn relative rock movement of said rock member and body, and means controlled by movement of either of said pressure members toward the other of said pressure members for indicating extent of compression of said spring in terms of pressure applied through said body, spring and rock members to the work.

5. A torque measuring wrench comprising a pair of relatively rockable members one of which is provided with means by which it is adapted to be engaged with the work, a compressible spring carried by one of said members, slidable pressure members between the opposite ends of said spring and the other of said members whereby said spring is connected to the latter to yieldably oppose relative rock movement of said members in opposite directions, means directly connected to said pressure members and operable by movement of either thereof for indicating extent of compression of said spring in terms of pressure applied through said members and said spring to the work.

6. A torque measuring wrench comprising a pair of relatively rockable members one of which is provided with means by which it is adapted to be engaged with the work, a compressible spring carried by one of said members, pressure members between the opposite ends of said spring and the other of said members whereby said spring yieldably opposes relative rock movement of said members in opposite directions, and means for indicating the pressure applied through the wrench to the work which includes a movable indicating member carried by one of said pressure members, an actuating element carried by the other of said pressure members, and means operatively engaging said actuating element with said indicating member.

7. A torque measuring wrench comprising a pair of relatively rockable members one of which is provided with means by which it is adapted to be engaged with the work, a compressible spring carried by one of said members, pressure members between the opposite ends of said spring and the other of said members whereby said spring yieldably opposes relative rock movement of said members in opposite directions, and means for indicating the extent of compression of said spring in terms of pounds pressure applied to the work which includes a gage device carried by one of said pressure members and having a movable indicator and an actuator therefor projecting from said gage device, an arm on the other of said pressure members disposed in the path of said actuator so that movement of either of said pressure members relative to the other moves said indicator.

8. A torque measuring wrench comprising a body, a rock member carried thereby and having means by which it is adapted to be engaged with the work, arm members on said rock member on the opposite sides of the rock center thereof and extending lengthwise of said body, a compression spring carried by said body with its ends directed toward and in alignment with said arms, a pressure member at each end of said spring slidably carried by said body and having a part projecting into engagement with the adjacent of said arms, whereby said spring holds said rock member in a neutral or balanced position with respect to said body and yieldably opposes relative rock movement of said rock member and body, and means for indicating the extent of compression of said spring in terms of pressure applied to the work which includes an arm on one of said pressure members slidable relative to and projecting from said body, a gage member carried by said arm and having a calibrated scale thereon, an indicator movable relative thereto and an actuator for said indicator, an arm on the other of said pressure members slidable relative to and projecting from said body, and an element carried by said latter arm and adapted to engage said actuator for moving said indicator upon movement of either of said pressure members relative to said body.

9. A torque measuring wrench comprising a body, a rock member carried thereby and having adapter means by which it is adapted to be engaged with the work, elongated arm members projecting from said rock member on the opposite sides of the rock center thereof and extending lengthwise of said body, a compression spring carried by said body with its axis extending at substantially right angles to said arms, a pressure member at each end of said spring slidably carried by said body and having a stem part projecting from said body into engagement with the adjacent of said arms, whereby said spring acts on said arms to hold said rock member in a neutral or balanced position with respect to said body and yieldably opposes relative rock movement of said rock member and body, and means for indicating the extent of compression of said spring in terms of pounds pressure applied to the work which includes an arm on one of said pressure members movable relative to and projecting from said body, a gage member carried by said arm and having a calibrated scale thereon, an indicator movable relative to said scale and an actuator for said indicator, an arm on the other of said pressure members movable relative to and projecting from said body, said latter arm projecting into alignment with said actuator, and an element carried by said latter arm and adjustable toward and from said actuator and by which said latter arm is adjustably connected with said actuator.

10. A torque measuring wrench comprising a shank member having means at one end for engaging the work and a pair of longitudinally extending and laterally spaced arms at the other end, a handle member adapted to be grasped by the hand of the operator and longitudinally aligned with said shank, a bifurcate member on the end of said handle member adjacent said shank member, means for rockably mounting the arm end of said shank member between the bifurcations of said bifurcate member with said arms extending along the sides of the latter toward said handle member, a spring carried by said bifurcate member and operatively connected with both of said arms for yieldably opposing relative rock movement of said shank and handle members in opposite directions, and means controlled by the relative rock movement of said shank and handle members for measuring the extent of such movement in terms of pounds pressure applied to the work.

11. A torque measuring wrench comprising a handle section having integral means at one end for engaging the work and an integral pair of laterally spaced and longitudinally extending arms at its other end, a second handle section adapted to be grasped by the hand of the operator and longitudinally aligned with said first handle section so as to serve as an extension thereof, a member carried by the end of said second handle section adjacent said first handle section, means for rockably connecting the arm end of said first handle section to said member with said arms extending longitudinally along said member, a single compression spring carried by said member and extending at substantially right angles to said arms, means between the opposite ends of said spring and said arms for operatively connecting these parts so that said spring yieldably opposes movement of both of said arms theretoward and, in turn, relative rock movement of said handle sections, and indicating means between and operatively associated with said handle sections for registering extent of relative rock movement therebetween in opposite directions in terms of pounds pressure applied through said handle sections to the work.

12. A torque measuring wrench comprising a pair of extensions, one having means at one end for engaging the work and a pair of laterally spaced, longitudinally extending arms at its other end, the other extension being adapted to be grasped by the hand of the operator and longitudinally aligned with said one extension, a shell-like member carried by said other extension, and in which the arm end of said one extension is received, means for rockably connecting the arm end of said one extension to said shell member, a laterally disposed compression spring carried by said shell member between said arms and operatively associated with the latter so that it yieldably opposes relative rock movement of said extension in opposite directions, and indicating means between said extensions and controlled by the relative rock movement thereof for measuring the extent of such movement in terms of pressure applied through said extensions to the work.

13. A torque measuring wrench comprising a handle section having means at one end for engaging the work and a pair of laterally spaced, longitudinally extending arms at its other end, a second handle section adapted to be grasped by the hand of the operator and longitudinally aligned with said first handle section, a shell-like member on said second handle section and in which the arm end of said first handle section is received, means for rockably connecting the arm end of said first handle section to said shell member, a compression spring carried by said shell member between said arms and yieldably opposing relative rock movement of said handle sections in opposite directions, and means for indicating the extent of relative rock movement between said handle sections in terms of inch pounds pressure applied through the handle sections to the work which includes a scale member, a gage hand rotatable relative thereto, and means for rotating said gage hand comprising gear connections carried in part by said first handle section and in part by said shell member.

HERMAN W. ZIMMERMAN.